United States Patent
Taylor et al.

(10) Patent No.: US 11,061,223 B2
(45) Date of Patent: Jul. 13, 2021

(54) DISTORTION CONTROLLED PROJECTOR FOR SCANNING SYSTEMS

(71) Applicant: Facebook Technologies, LLC, Menlo Park, CA (US)

(72) Inventors: Byron Taylor, Sammamish, WA (US); Wanli Chi, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 248 days.

(21) Appl. No.: 16/289,516

(22) Filed: Feb. 28, 2019

(65) Prior Publication Data

US 2020/0278538 A1    Sep. 3, 2020

(51) Int. Cl.
*G02B 27/00* (2006.01)
*G02B 26/10* (2006.01)

(52) U.S. Cl.
CPC ......... *G02B 27/0031* (2013.01); *G02B 26/10* (2013.01)

(58) Field of Classification Search
CPC combination set(s) only.
See application file for complete search history.

(56) References Cited

U.S. PATENT DOCUMENTS

| | | |
|---|---|---|
| 10,162,254 B1 | 12/2018 | Taylor et al. |
| 2006/0007058 A1 | 1/2006 | Yamamoto et al. |
| 2007/0170365 A1* | 7/2007 | Williams ............. H04N 9/3129 |
| | | 250/370.08 |
| 2019/0025590 A1* | 1/2019 | Haddick .............. G02B 27/141 |
| 2019/0227322 A1 | 7/2019 | Schaub et al. |
| 2020/0186765 A1* | 6/2020 | Saracco ............... G02B 27/005 |

FOREIGN PATENT DOCUMENTS

| | | |
|---|---|---|
| TW | 202036096 | 10/2020 |
| WO | 2020176340 | 9/2020 |

OTHER PUBLICATIONS

PCT/US2020/019204, "International Search Report and Written Opinion", dated Jun. 3, 2020, 14 pages.

* cited by examiner

*Primary Examiner* — Jennifer D. Carruth
(74) *Attorney, Agent, or Firm* — Weaver Austin Villeneuve & Sampson LLP

(57) ABSTRACT

Disclosed herein are systems and methods of reducing distortion in an image displayed on a near-eye display. Described herein is a display system including a light assembly configured to generate source light for a display image, a distortion correcting optics assembly, and a mirror scanning system configured to receive pre-distorted and collimated light and reflect and scan the pre-distorted and collimated light to provide an image on an image plane. The distortion correcting optics assembly delivers pre-distorted and collimated light to the mirror scanning system, the mirror scanning system is configured to undistort the pre-distorted light and transmit an undistorted image to a display.

20 Claims, 16 Drawing Sheets

DISTORTION CONTROLLED PROJECTOR FOR SCANNING SYSTEMS

BACKGROUND

The present disclosure generally relates to optical projection systems, specifically a light projection system that includes a scanning display system.

Headsets in artificial reality (AR) applications typically display image content via some form of display. For many applications, it is desirable to have a light headset having a small form factor. But, designing a display for such a headset is difficult. A projection system in the display generates image light. However, a combination of space constraints (e.g., very compact), field of view (e.g., wide to facilitate an immersive AR experience), and an external stop location tend to limit optical designs for projectors and have limited conventional headset design. Further, attempts to create small form factor projection systems can face design problems such as designing a projection system that causes optical and differential distortion.

SUMMARY

Described herein is a display system comprising: (i) a light assembly configured to generate source light for a display image; (ii) a distortion correcting optics assembly comprising: (a) an anamorphic field lens configured to apply a first distortion to the source light, and (b) an optical device including at least one anamorphic aspheric surface configured to apply a second distortion to the source light from the anamorphic field lens, the second distortion comprising collimation; and (iii) a scanning system configured to redirect the source light having the first distortion and second distortion from the distortion correcting optics assembly, wherein the first distortion and the second distortion at least partially compensate for optical distortion caused by the scanning system. In certain embodiments, the light assembly comprises one or more light sources. In certain embodiments, the one or more light sources provides one or more display pixels. In certain embodiments, the one or more display pixels comprise an image light. In certain embodiments, the source light having the first distortion and second distortion comprises pre-distorted and collimated source light.

In certain embodiments, the anamorphic field lens is configured to perform at least one of collimating the source light, expanding the source light, or adjusting an orientation of the source light. In certain embodiments, the anamorphic field lens is configured to apply axisymmetric adjustment to the source light. In certain embodiments, the optics assembly comprises a monolithic prism. In certain embodiments, the optics assembly comprises a freeform prism including one or more light transmission surfaces, and one or more light reflection surfaces. In certain embodiments, the freeform prism is configured to distort and collimate the source light. In certain embodiments, the one or more light transmission surface comprises a freeform surface. In certain embodiments, the one or more light transmission surface comprises a Zernike surface, an anamorphic aspheric surface, a flat surface, a non-rotationally symmetric surface, or a non-axisymmetric surface. In certain embodiments, the one or more reflective surface comprises a Zernike surface, an anamorphic aspheric surface, a flat surface, a non-rotationally symmetric surface, or a non-axisymmetric surface. In certain embodiments, the scanning system comprises a mirror scanning system. In certain embodiments, the mirror scanning system is configured to undistort the pre-distorted and collimated source light outputted from the distortion correcting optics assembly.

In certain embodiments, the distortion correcting optics assembly and the scanning system are configured to transmit undistorted image light to an image plane. In certain embodiments, the image plane comprises at least one of a virtual image plane, a coupler, a waveguide, a display, a near-eye display, or a user. In certain embodiments, undistorted image light comprises an image light devoid of at least a barrel distortion, a pincushion distortion, a mustache distortion, a keystone distortion, or a differential distortion. In certain embodiments, at least the barrel distortion, the pincushion distortion, the mustache distortion, the keystone distortion, or the differential distortion comprises pixel misalignment on an image plane. In certain embodiments, the distortion correcting optics assembly provides pixel alignment on the image plane.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

Figure 1:
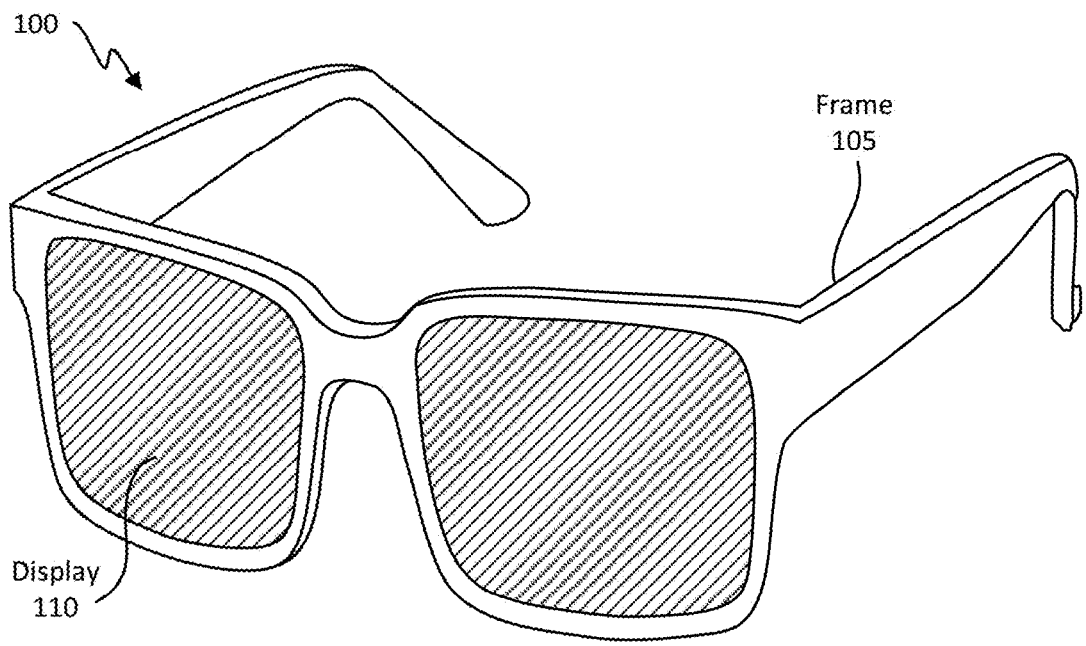
FIG. 1 is a diagram of an embodiment of a near-eye display.

FIG. 1 is a diagram of an embodiment of a near-eye display 100. The near-eye display 100 presents media to a user. Examples of media presented by the near-eye display 100 include one or more images, video, and/or audio. In some embodiments, audio may be presented via an external device (e.g., speakers and/or headphones) that receives audio information from the near-eye display 100, a console, or both, and presents audio data based on the audio information. The near-eye display 100 is generally configured to operate as a virtual reality (VR) display. In some embodiments, the near-eye display 100 may be modified to operate as an augmented reality (AR) display and/or a mixed reality (MR) display.

The near-eye display 100 includes a frame 105 and a display component 110. The frame 105 is coupled to one or more optical elements. The display component 110 is configured for the user to see content presented by the near-eye display 100. In some embodiments, the display component 110 comprises a waveguide display assembly for directing light from one or more images to an eye of the user.

Figure 2:
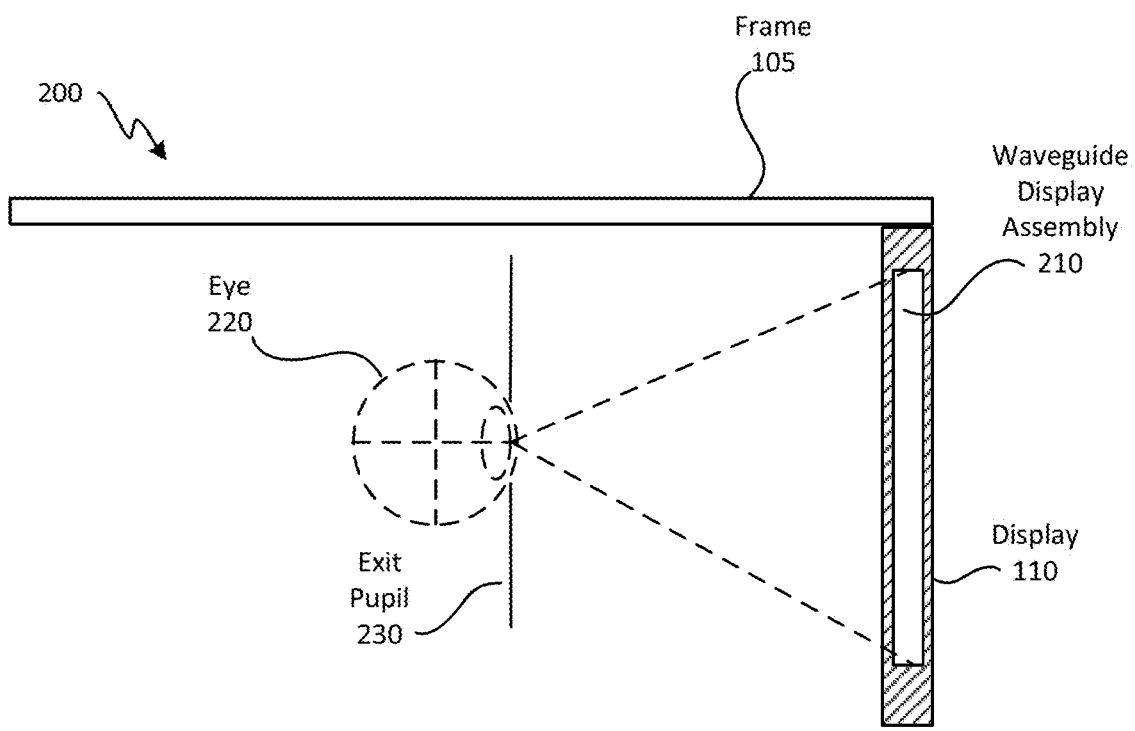
FIG. 2 is an illustration of a cross section of a near-eye display, according to an embodiment.

FIG. 2 is an illustration of a cross section 200 of the near-eye display 100 illustrated in FIG. 1, according to an embodiment. The display component 110 includes at least one waveguide display assembly 210. An exit pupil 230 is a location where the eye 220 may be positioned in an eye box region of the display component 110 when the user wears the near-eye display 100. For purposes of illustration, FIG. 2 shows the cross section 200 associated with a single eye 220 and a single waveguide display assembly 210, but a second waveguide display component may be used for a second eye of a user.

The waveguide display assembly 210 is configured to direct image light to an eye box located at the exit pupil 230 and to the eye 220. The waveguide display assembly 210 may be composed of one or more materials (e.g., plastic, glass, etc.) with one or more refractive indices. In some embodiments, the near-eye display 100 includes one or more optical elements between the waveguide display assembly 210 and the eye 220.

In some embodiments, the waveguide display assembly 210 includes a stack of one or more waveguide displays including, but not restricted to, a stacked waveguide display, a varifocal waveguide display, etc. in some embodiments, the stacked waveguide display may be a polychromatic display (e.g., a red-green-blue (RGB) display) created by stacking waveguide displays whose respective monochromatic sources are of different colors. In some embodiments, the stacked waveguide display may be a polychromatic display that can be projected on multiple planes (e.g. multi-planar colored display). In some configurations, the stacked waveguide display may be a monochromatic display that can be projected on multiple planes (e.g. multi-planar monochromatic display). As noted above, embodiments may comprise a varifocal waveguide display that can adjust a focal position of image light emitted from the waveguide display. In alternate embodiments, the waveguide display assembly 210 may include the stacked waveguide display and the varifocal waveguide display.

Figure 3:
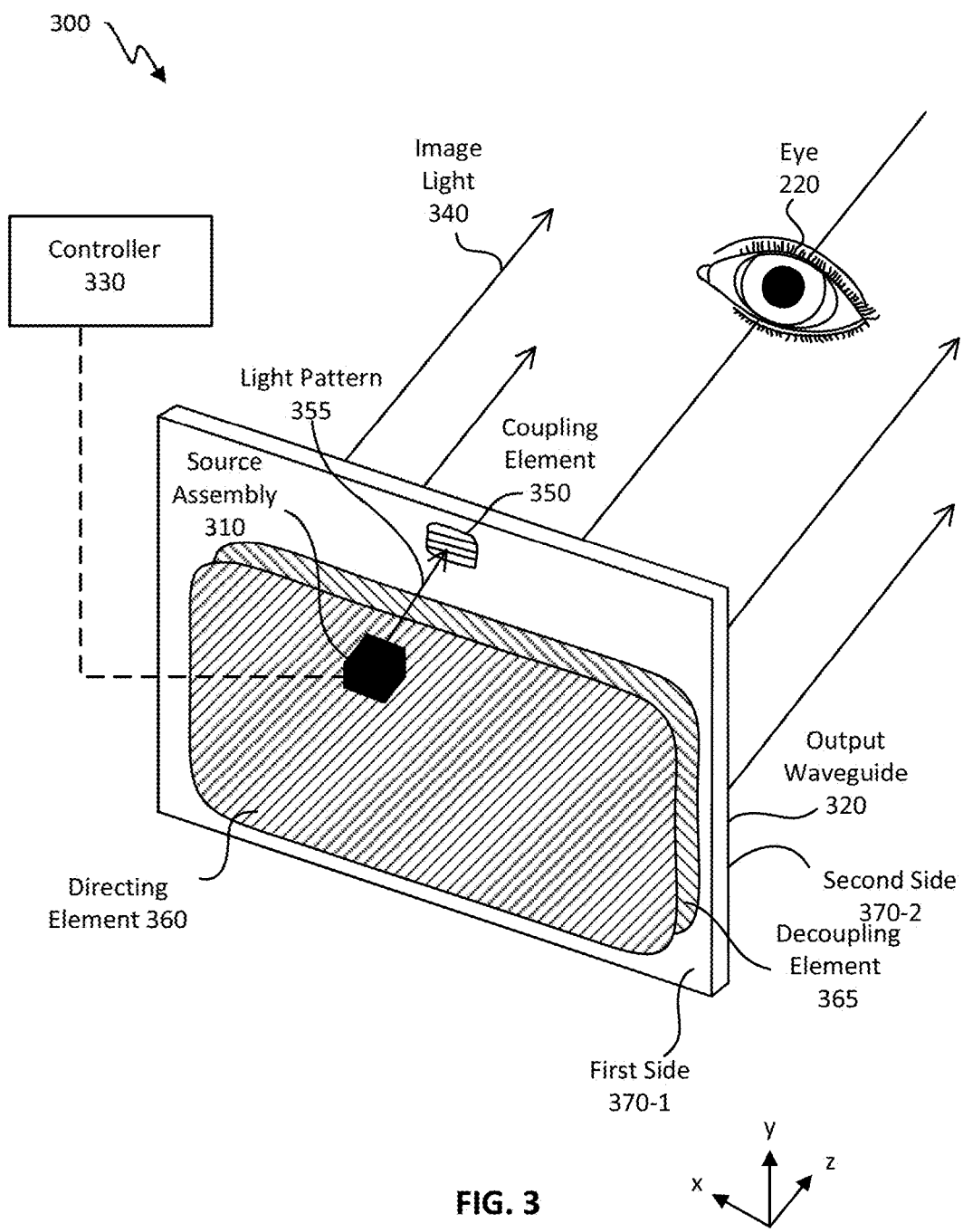
FIG. 3 is an isometric view of an embodiment of a waveguide display.

FIG. 3 is an isometric view of an embodiment of a waveguide display 300. In some embodiments, the waveguide display 300 may be a component (e.g., the waveguide display assembly 210) of the near-eye display 100. In some embodiments, the waveguide display 300 is part of some other near-eye display or other system that directs image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate, or partially separate, from the waveguide display 300 provides image light to another eye of the user.

The source assembly 310 generates light pattern 355. The source assembly 310 generates and outputs the light pattern 355 to a coupling element 350 located on a first side 370-1 of the output waveguide 320. The output waveguide 320 comprises an optical waveguide that outputs expanded image light 340 to an eye 220 of a user. The output waveguide 320 receives the light pattern 355 at one or more coupling elements 350 located on the first side 370-1 and guides received light pattern 355 to a directing element 360. In some embodiments, the coupling element 350 couples the light pattern 355 from the source assembly 310 into the output waveguide 320. The coupling element 350 may be, e.g., a diffraction grating, a holographic grating, one or more cascaded reflectors, one or more prismatic surface elements, and/or an array of holographic reflectors.

The directing element 360 redirects the received light pattern 355 to the decoupling element 365 such that the received light pattern 355 is decoupled out of the output waveguide 320 via the decoupling element 365. The directing element 360 may be part of, or affixed to, the first side 370-1 of the output waveguide 320. The decoupling element 365 may be part of, or affixed to, the second side 370-2 of the output waveguide 320, such that the directing element 360 is opposed to the decoupling element 365. The directing element 360 and/or the decoupling element 365 may be, e.g., a diffraction grating, a holographic grating, one or more cascaded reflectors, one or more prismatic surface elements, and/or an array of holographic reflectors.

The second side 370-2 represents a plane along an x-dimension and a y-dimension. The output waveguide 320 may be composed of one or more materials that facilitate total internal reflection of the light pattern 355. The output waveguide 320 may be composed of e.g., silicon, plastic, glass, and/or polymers. The output waveguide 320 has a relatively small form factor. For example, the output waveguide 320 may be approximately 50 mm wide along x-dimension, 30 mm long along y-dimension and 0.5-1 mm thick along a z-dimension.

The controller 330 controls scanning operations of the source assembly 310. The controller 330 determines scanning instructions for the source assembly 310. In some embodiments, the output waveguide 320 outputs expanded image light 340 to the user's eye 220 with a large field of view (FOV). For example, the expanded image light 340 provided to the user's eye 220 with a diagonal FOV (in x and y) of 60 degrees or greater and/or 150 degrees or less. In some embodiments, output waveguide 320 may be configured to provide an eye box with a length of 20 mm or greater and/or equal to or less than 50 mm; and/or a width of 10 mm or greater and/or equal to or less than 50 mm.

Figure 4:
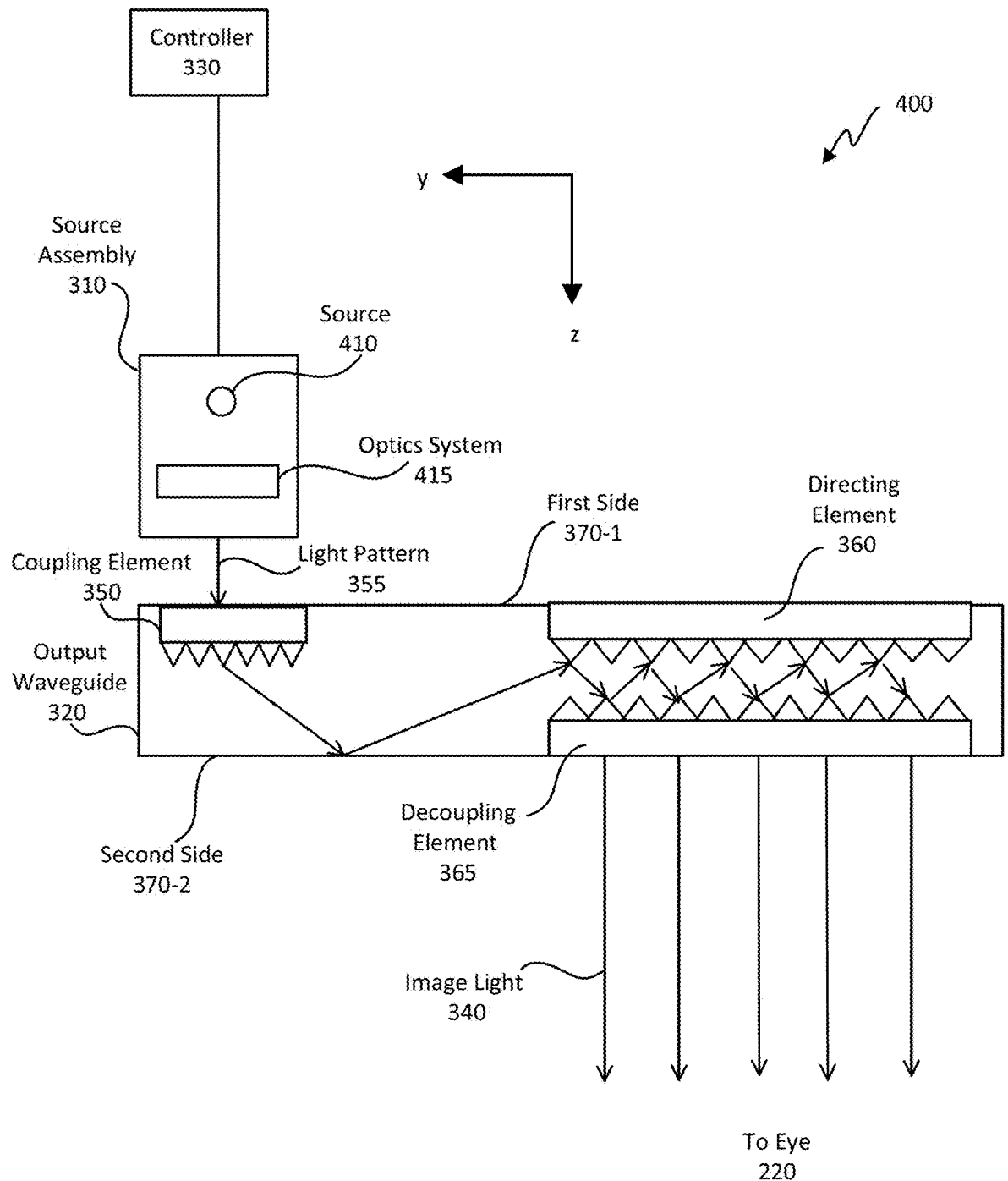
FIG. 4 is an illustration of a cross section of the waveguide display, according to an embodiment.

FIG. 4 is an illustration of a cross section 400 of the waveguide display 300, according to an embodiment. The cross section 400 can include the source assembly 310 and the output waveguide 320. The source assembly 310 can generate a light pattern 355 in accordance with scanning instructions from the controller 330. The source assembly 310 can include a source 410 and an optics system 415. The source 410 may comprise a light source (e.g., a light assembly, as described in further detail below) that generates coherent or partially coherent light. The source 410 may comprise one or more light sources, which may include, e.g., a laser diode, a vertical cavity surface emitting laser, a light emitting diode (LED), and/or the like.

The optics system 415 may include one or more optical components that condition the light from the source 410. Conditioning light from the source 410 may include, e.g., expanding, collimating, and/or adjusting orientation in accordance with instructions from the controller 330. The one or more optical components may include one or more lens, liquid lens, mirror, aperture, and/or grating. In some embodiments, the optics system 415 includes a liquid lens with a plurality of electrodes that allows scanning a beam of light with a threshold value of scanning angle to shift the beam of light to a region outside the liquid lens. Light emitted from the optics system 415 (and also the source assembly 310) is referred to as light pattern 355.

The output waveguide 320 receives the light pattern 355. The coupling element 350 couples the light pattern 355 from the source assembly 310 into the output waveguide 320. In embodiments where the coupling element 350 is diffraction grating, a pitch of the diffraction grating is chosen such that total internal reflection occurs in the output waveguide 320, and the light pattern 355 propagates internally in the output waveguide 320 (e.g., by total internal reflection), toward the decoupling element 365.

The directing element 360 redirects the light pattern 355 toward the decoupling element 365 for decoupling from the output waveguide 320. In embodiments where the directing element 360 is a diffraction grating, the pitch of the diffraction grating is chosen to cause incident light pattern 355 to exit the output waveguide 320 at angle(s) of inclination relative to a surface of the decoupling element 365.

In some embodiments, the directing element 360 and/or the decoupling element 365 are structurally similar. The image light 340 exiting the output waveguide 320 is expanded along one or more dimensions (e.g., may be elongated along x-dimension). In some embodiments, the waveguide display 300 includes a plurality of source assemblies 310 and a plurality of output waveguides 320. In such embodiments, each of the source assemblies 310 may be a monochromatic image light of a specific band of wavelength corresponding to a primary color (e.g., red, green, or blue). Further, each of the output waveguides 320 may be stacked together with a distance of separation to output image light 340 that is multi-colored.

Figure 5:
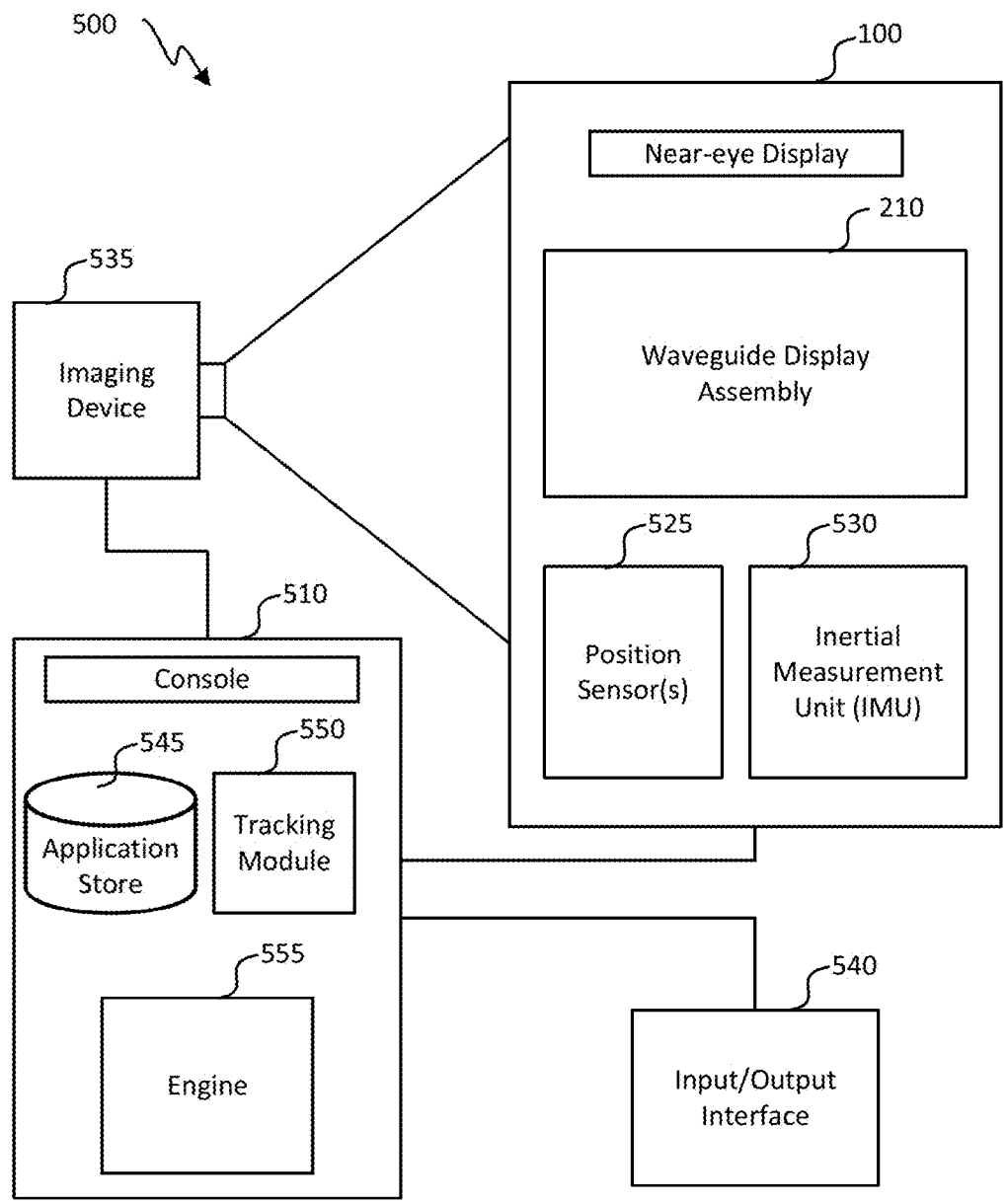
FIG. 5 is a block diagram of an embodiment of a system including a near-eye display.

FIG. 5 is a block diagram of certain electrical and optical components of a an embodiment of a system 500 including the near-eye display 100. The system 500 comprises the near-eye display 100, an imaging device 535, and an input/output interface 540 that are each coupled to a console 510.

The near-eye display 100 is a display that presents media to a user. Examples of media presented by the near-eye display 100 include one or more images, video, and/or audio. In some embodiments, audio is presented via an external device (e.g., speakers and/or headphones) that receives audio information from the near-eye display 100 and/or the console 510 and presents audio data based on the audio information to a user. In some embodiments, the near-eye display 100 may also act as an AR eyewear glass. In some embodiments, the near-eye display 100 augments views of a physical, real-world environment, with computer-generated elements (e.g., images, video, sound, etc.).

The near-eye display 100 may include a waveguide display assembly 210, one or more position sensors 525, and/or an inertial measurement unit (IMUS) 530. The waveguide display assembly 210 may additionally or alternatively include the source assembly 310, the output waveguide 320, and the controller 330.

The IMUS 530 may comprise an electronic device that generates fast calibration data indicating an estimated position of the near-eye display 100 relative to an initial position of the near-eye display 100 based on measurement signals received from one or more of the position sensors 525.

The imaging device 535 may generate slow calibration data in accordance with calibration parameters received from the console 510. The imaging device 535 may include, for example, one or more cameras and/or one or more video cameras.

The input/output interface 540 comprises a device that allows a user to send action requests to the console 510. Here, action request may comprise a request to perform a particular action. For example, an action request may be to start or end an application or to perform a particular action within the application.

The console 510 provides media to the near-eye display 100 for presentation to the user in accordance with information received from one or more of: the imaging device 535, the near-eye display 100, and the input/output interface 540. In the example shown in FIG. 5, the console 510 includes an application store 545, a tracking module 550, and an engine 555.

The application store 545 stores one or more applications for execution by the console 510. An application is a group of instructions, that when executed by a processor, generates content for presentation to the user. Examples of applications include: gaming applications, conferencing applications, video playback application, or other suitable applications.

The tracking module 550 may calibrate the system 500 using one or more calibration parameters and may adjust one or more calibration parameters to reduce error in determination of the position of the near-eye display 100.

The tracking module 550 may track movements of the near-eye display 100 using slow calibration information from the imaging device 535. The tracking module 550 may also determine positions of a reference point of the near-eye display 100 using position information from the fast calibration information.

The engine 555 may execute applications within the system 500 and receives position information, acceleration information, velocity information, and/or predicted future positions of the near-eye display 100 from the tracking module 550. In some embodiments, information received by the engine 555 may be used for producing a signal (e.g., display instructions) to the waveguide display assembly 210 that determines a type of content presented to the user.

Because the near-eye display 100 may be worn by a user, the design may employ features to accommodate this use case, such as being lightweight and low power. With this in mind, some embodiments may utilize a source assembly (e.g., source assembly 310 of FIGS. 3-4) that utilizes a mirror scanning system in which the mirror is used to scan one or more light sources (e.g., source 410 of FIG. 4) to create an output light pattern (e.g., light pattern 355 of FIG. 4).

Figure 6:
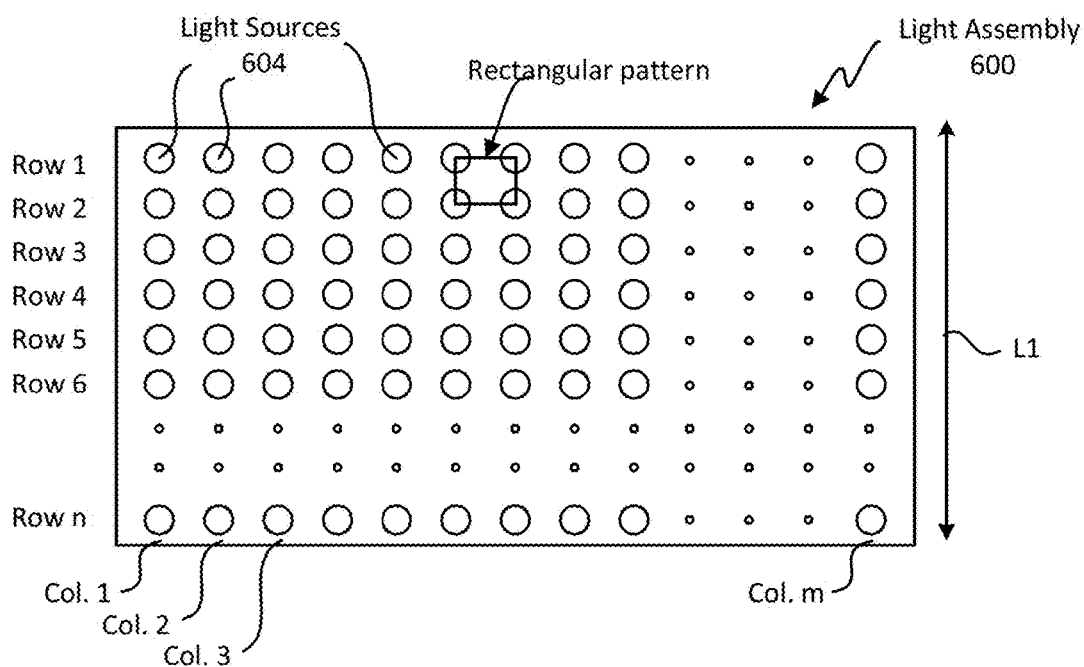
FIG. 6 is a diagram of an embodiment of a light assembly for an artificial reality display.

FIG. 6 is a diagram of an embodiment of a light assembly 600 that can be utilized in such a mirror scanning system. The light assembly 600 (which may correspond to source 410 of FIG. 4) comprises an array, or pattern, of light sources 604, each of which may emit light of a particular color or wavelength band. In some embodiments, light sources 604 may comprise lasers or LEDs (e.g., micro LEDs), which can be placed or otherwise fabricated on a common substrate, or "chip." As used herein, the term "chip" is directed an array or group of light sources packaged together with electrical interconnects for accessing the light sources. Additional embodiments below describe how a light assembly 600 may comprise multiple chips. In some embodiments, the light sources 604 may be arranged in rows and columns. For example, as shown in FIG. 6, the light assembly 600 may include row 1, row 2, row 3, row 4, row 5, row 6 to row n; column 1, column 2, column 3, to column m of the light assembly 600, as illustrated. In some embodiments, twelve rows are used in the light assembly 600; four rows of light sources 604 have red LEDs, four rows of light sources 604 have green LEDs, and four rows of light sources 604 have blue LEDs. In some embodiments, 3 to 7 rows of light sources 604 are used for one color in the light assembly 600. Other embodiments may vary.

It can be noted that, although the array of light sources 604 of the light assembly 600 of FIG. 6 form rectangular patterns of light sources 604 (in which light sources 604 from all rows are aligned into columns), embodiments are not so limited. As described in additional detail below, alternative embodiments of a light assembly 600 may include arrays of light sources 604 that form hexagonal or other patterns, which may result in some rows or columns of light sources 604 not aligning with other rows or columns. (As used herein, therefore, the terms "row" and "column", when used to refer to light sources 604 of a light assembly 600, are used to refer to subsets of light sources 604 of the light assembly 600 that align to illuminate corresponding pixels along scan lines of an output light pattern, as described herein below.) It can be further noted that light sources 604 may emit light in a circular pattern, which can be useful when phasing light sources 604 of one row and/or column with another row and/or column. Even so, in alternative embodiments light sources may additionally or alternatively be noncircular.

Figure 7:
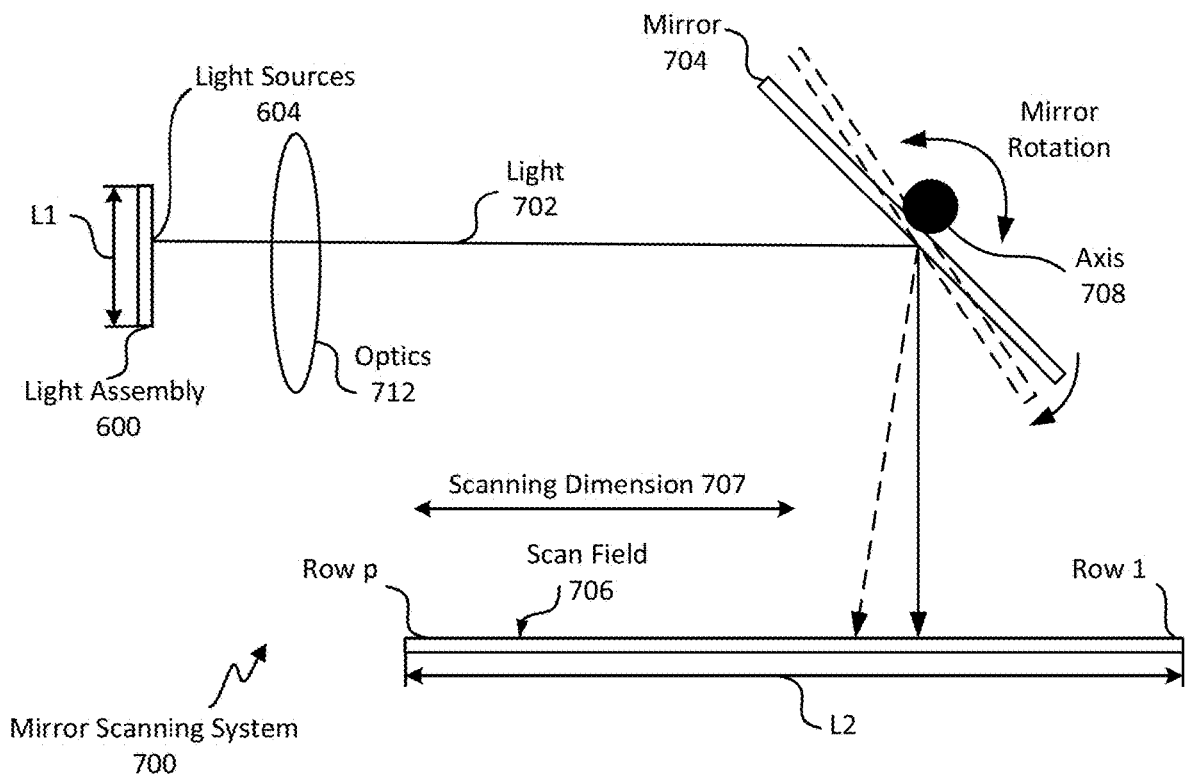
FIG. 7 is a diagram of an embodiment of a mirror scanning system that may be utilized in a near-eye display.

FIG. 7 is a diagram of an embodiment of a mirror scanning system 700 that may be utilized in a source assembly (e.g. source assembly 310 of FIGS. 3-4) of a near-eye display (e.g., near-eye display 100 of FIG. 1), illustrating how a light assembly 600 may be scanned by a mirror 704 to project an output light pattern in a scan field 706. In the illustrated embodiment, the mirror scanning system 700 comprises the light assembly 600, mirror 704, and optics 712. Scan field 706 may comprise a virtual image plane where an output light pattern is provided (and where a waveguide or other optical element may be placed to receive the output light pattern, as indicated in previous embodiments).

The operation of the mirror scanning system 700 may proceed generally as follows. During a scanning period, light 702 emitted from light sources 604 of the light assembly 600 can be reflected off of mirror 704 onto the scan field 706. The mirror 704 rotates about an axis 708 (as illustrated by dotted lines) to direct the light 702 at different angles to illuminate different portions of the scan field 706 along a scanning dimension 707 over the course of the scanning period. Thus, the mirror 704 "scans" the light assembly 600 over the course of the scanning period by rotating to redirect light 702 from the light assembly 600 over the entire scan field (e.g., row 1 to row p) along the scanning dimension 707. The light assembly 600 can emit different patterns of light at different times to illuminate the scan field 706, to create an output light pattern, which may be an image or precursor to an image. The output light pattern may correspond with light pattern 355 of FIG. 4, and may therefore be provided to a coupling element 350 of an output waveguide 320 to form the image light 340 provided to a user's eye.

The type of mirror 704 used to scan the light assembly 600 may vary, depending on desired functionality. In some embodiments, for example, the mirror 704 may comprise a scanning MEMS mirror configured scan the light assembly 600 by oscillating back and forth to reflect light along the scanning dimension. In other embodiments, the mirror 704 may comprise a spinning mirror (e.g., a multi-faceted mirror) configured to spin about an axis to scan the light assembly 600 in one direction along the scanning dimension. Other embodiments may vary. Accordingly, the "rotation" of the mirror 704 about an axis as described herein may comprise partial rotation (e.g., oscillation) and/or full rotation (e.g., spinning).

Optics 712 may be used to collimate and/or focus light from the light assembly 600 to the mirror 704 and/or to the scan field 706. Optics 712 and mirror 704 may correspond to the optics system 415 of FIG. 4. The optics 712 may therefore include one or more lenses, gratings, apertures, and/or other optical elements as described with regard to FIG. 4 above.

As previously indicated, the scan field 706 is illuminated with an output light pattern over the course of a scanning period. The output light pattern can be divided into an array of output pixels, divided into rows and columns. (In the embodiment illustrated in FIG. 7, scan field 706 has row 1 to row p.) Each pixel in the output light pattern may be illuminated by one or more light sources 604 in a corresponding column of the light assembly 600 over the course of a scanning period. As the mirror 704 rotates, light sources 604 of the light assembly 600 can flash at certain times during the scanning period to illuminate respective pixels of the output light pattern in the scan field 706. The mirror 704 rotates to redirect light 702 along a scanning dimension 707 such that columns of light sources 604 along the length L1 of the light assembly illuminate respective columns of pixels of the output light pattern in the scan field 706. Due to the mirror 704 rotation, each light source 604 of a column in the light assembly 600 is available to illuminate a corresponding pixel in the output light pattern. In some embodiments, the length L2 of the scan field 706 may exceed the length L1 of the light assembly 600 and/or the number of rows of pixels the output light pattern along length L2 may exceed the number of rows of light sources 604 along length L1 of the light assembly. In some embodiments, for example, the number of rows, p, in the output light pattern of the scan field 706 may be 50 to 10,000 times greater the number of rows, n, and the light assembly 600. (In embodiments, such as those described herein, in which the mirror 704 rotates to scan the light assembly 600 along a single scanning dimension 707, the number of columns in the output light pattern may therefore correspond with the number of columns, m, in the light assembly 600. That said, in alternative embodiments, mirror 704 may be configured to scan along two dimensions, in which case the number of columns in the output light pattern may be greater or fewer than the number of columns, m, in the light assembly 600.)

The speed at which the mirror 704 rotates can vary, depending on desired functionality. According to some embodiments, the rotation speed of the mirror 704 can correspond with a refresh rate of the near-eye display, which may occur several times (e.g., dozens or more) per second. In some embodiments, the mirror 704 may over rotate (e.g., continue rotating after the light 702 has illuminated the full scan field) to allow the mirror to "ramp down" its rotation speed and "ramp up" its rotation speed and opposite direction. This can allow for a relatively uniform scanning speed across the scan field 706. Because the mirror 704 can rotate in both directions (as indicated by the "mirror rotation" arrow in FIG. 7), the mirror scanning system 700 may be configured to scan light 702 from the light assembly 600 to the scan field 706 in both directions.

Depending on desired functionality, a full scan of the scan field 706 (e.g., the illumination of all pixels in an output light pattern in the scan field 706) over the course of a scanning period may be performed in a single pass (rotation) of the mirror 704, or multiple passes of the mirror 704. In some embodiments, for example, all rows of pixels in an output light pattern are illuminated in a single pass of the mirror 704. In other embodiments, the scanning may be interleaved to illuminate, for example, even rows of the output light pattern in a first pass of the scan field 706 in one direction along the scanning dimension 707, then illuminate odd rows of the output light pattern in a second pass of the scan field 706 in the opposite direction along the scanning dimension 707.

I. Spatial and Differential Distortion Caused by a Scanning Display System

The following describes example distortions caused by a scanning display system. In some cases, distortion is caused when the light assembly 600 is scanned by the mirror 704 to project the output light pattern in the scan field 706. For example, FIGS. 8A-8C illustrate the mirror scanning system 700 creating an output image by assembling a series of partial images.

Figure 8A:
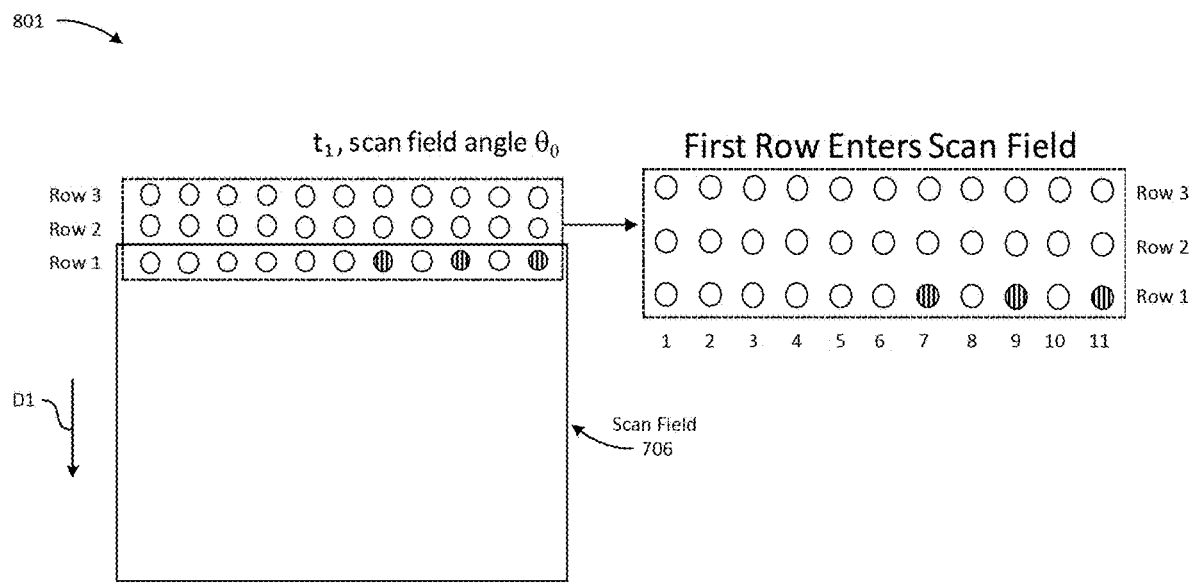
FIGS. 8A-8C show an example image formed by the light projection system.
Figure 8B:
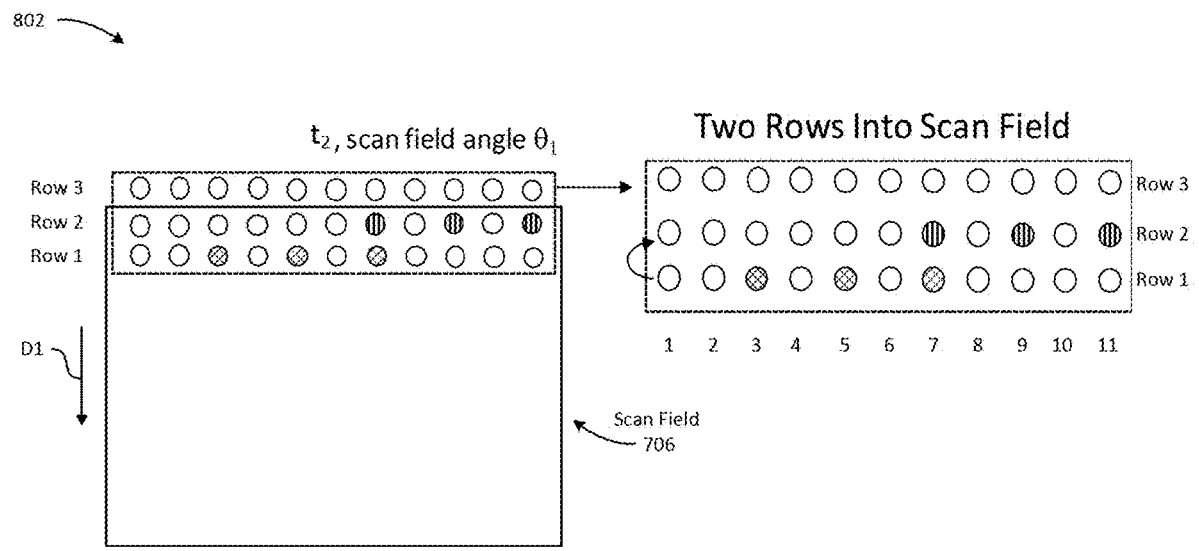
Figure 8C:
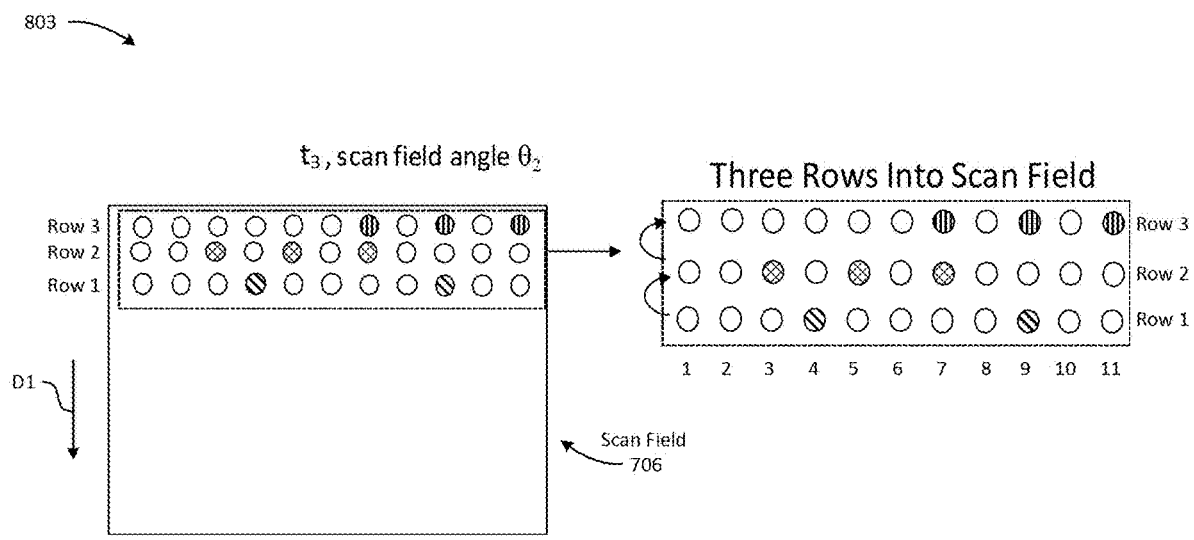

FIG. 8A depicts a first partial image 801, FIG. 8B depicts a second partial image 802, and FIG. 8C depicts a third partial image 803, illustrating three different partial images at three different times, $t_1$, $t_2$, and $t_3$. The partial images come from the mirror scanning system 700 scanning the light sources 604 onto the scan field 706 (e.g., an image plane, the virtual image plane, the coupler, the waveguide, the near-eye display, etc.). In the embodiment illustrated in FIGS. 8A-8C, as the mirror 704 rotates in time, row 1 of the light assembly 600 aligns with different rows of the scan field 706 as indicated in the figure. For example, at time $t_1$, row 1 of the light assembly 600 aligns with row 1 of the scan field 706; at time $t_2$ (see FIG. 8B), row 1 of the light assembly 600 aligns with row 2 of the scan field 706; at time $t_3$ (see FIG. 8C), row 1 of the light assembly 600 aligns with row 3 of the scan field 706; and so on. Scanning in this manner enables the mirror scanning system 700 to illuminate the entire scan field 706 with a complete output light pattern (e.g., illuminating rows 1 through p). It can be noted that, in alternative embodiments, the orientation may be different, depending on factors such as the optics and orientation of the mirror scanning system 700. Thus, as row 1 of the light assembly 600 aligns with various rows of the scan field 706, other rows of the light assembly 600 also align with respective rows of the scan field 706 over the course of the scanning period. At time $t_2$, for example, as row 1 of the light assembly 600 aligns with row 2 of the scan field 706, row 2 of the light assembly 600 aligns with row 1 of the scan field 706. At time $t_3$, rows 1, 2, and 3 of the light assembly 600 align with rows 3, 2, and 1 of the scan field 706, respectively. This manner of illumination continues over the course of the scanning period.

In some non-limiting examples, as illustrated in the first partial image 801 (see FIG. 8A), at time $t_1$, and scan field angle $\theta_0$, pixel numbers 7, 9, and 11 (counting form the left with the first pixel as 1 and last pixel as 11) of the first row are bright and the rest of the pixels in the row are dark. As described herein, a scan field angle $\theta$ corresponds to the position of the mirror 704 while rotating (i.e., at time $t_1$ the mirror 704 is positioned at scan field angle $\theta_0$). This row of 3 bright pixels and 8 dark pixels at time $t_1$ and scan field angle $\theta_0$, corresponding to row 1 of the light assembly 600, is projected onto a first row (e.g., row 1) of the scan field 706. As illustrated in partial image 802 (see FIG. 8B), at time $t_2$ and scan field angle $\theta_1$, a new configuration of pixels in the scan field 706 is illuminated. The new configuration effectively moves row 2 of the light assembly 600 into the scan field 706. Next, as illustrated in partial image 803 (see FIG. 8C), at time $t_3$ the mirror 704 is in a new position, scan field angle $\theta_2$, and row 3 of the light assembly 600 is now projected in the scan field 706. At this moment in time ($t_3$), and at this position ($\theta_2$), the mirror scanning system 700 projects another new configuration of pixels.

This pattern of scanning and changing configuration of light projected on the scan field 706 onto the image plane will continue until the mirror 704 scans or sweeps the image light all the way down the scan field 706 in a first direction D1. The mirror scanning system 700 may then scan the image light up the scan field 706 following the same pattern of scanning and changing configuration of the light projection. The scanning and changing configuration of the image light by the mirror scanning system 700 will effectively allow a user to perceive a full image by scanning and stacking a plurality of partial images in the scan field 706 onto the virtual image plane (e.g., onto a coupler, a waveguide, a near-eye display, and ultimately, to a user).

Differential Distortion

A potentially significant problem with a scanning display system such as that described above is optical distortion. For example, optics 712 in the mirror scanning system 700 can map an array of light such that each row of light enters the optics 712 as a straight row of light but exits the optics 712 as a curved row of light on the virtual image plane. The optical distortion caused by the optics 712 (e.g., at least a portion of an optics assembly, including lenses, prisms, gratings, filters, other optics assemblies, or the like) can be at least barrel distortion, pincushion distortion, mustache distortion, keystone distortion, or a combination thereof.

Thus, the image light 340 scanned onto the virtual image plane can have a differential distortion wherein curved lines of pixels can then cause a blur to a user as the mirror 704 scans the light assembly 600 down and up the scan field 706.

Figure 9:
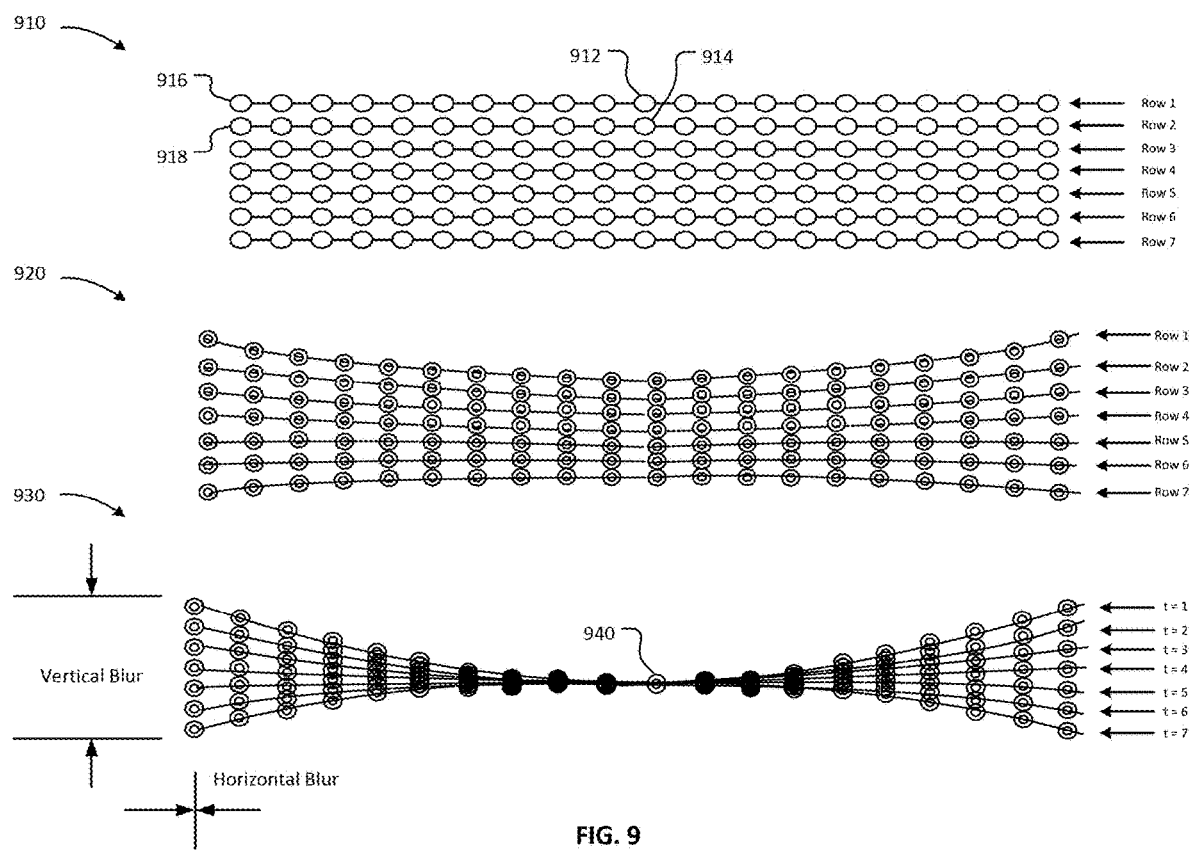
FIG. 9 shows image distortion according to certain embodiments.

FIG. 9 illustrates an example blur effect from a scanning display system such as that described above. An example light source array 910 illustrates a projection of image light from a rectangular array of light sources 604 of a light assembly 600 without any distortion (i.e., an image as intended, wherein the optics 712 receives an array of light emitted from the light assembly 600 and maps the array of light onto the mirror 704 as received). Because the light assembly 600 is configured in a rectangular array with straight rows of light sources 604, the image light will enter the optics 712 with straight rows of pixels. As such, each pixel of rows 1-7 of the light source array 910 are equally spaced by row. For example, the spacing of a middle pixel of row 1 (912) to a middle pixel of row 2 (914) is the same as the spacing of an edge pixel of row 1 (916) to an edge pixel of row 2 (918).

However, differential distortion can cause a rectangular light source array 910 with straight rows of pixels to map rows of pixels onto the virtual image plane in curved rows (e.g., a differentially distorted image 920). In certain embodiments, the differential distortion causes pixels at the edges of the output plane to map to a different location in the scan field 706. For example, in the light source array 910 the spacing of the middle pixel of row 1 (912) to the middle pixel of row 2 (914) is the same as the spacing of the edge pixel of row 1 (916) to the edge pixel of row 2 (918). However, in the differentially distorted image 920, the spacing of the middle pixel of row 1 (912) to the middle pixel of row 2 (914) is less than the spacing of the edge pixel of row 1 (916) to the edge pixel of row 2 (918). Angular effects of the optics 712 can further cause a gradient in the row to row spacing as illustrated in the differentially distorted image 920 causing the rows of pixels to appear curved.

This differential distortion can cause a blur in a projected image. The blur results from pixels mapping in the scan field 706 in unintended positions. As such, rows of pixels can overlap, rows of pixels can be spaced too far apart, or any combination thereof. Referring to FIGS. 8A-8C, blur occurs when at least a portion of the pixels in a row of pixels is displaced. For example, a pixel intended to project in row 1 of the scan field 706 can project in row 2 of the scan field 706, causing blur.

The differential distortion can affect a single line of a projected image. In some cases, scanning and changing configuration of pixels in the scan field 706 is used to construct a single line of a projected image. Thus, a differentially distorted image 920 provides a vertically blurred line 930. As illustrated in FIG. 9, a single scan line of an image plane can include several light assembly 600 scans over a period of time. A non-blurred image (i.e., not differentially distorted) is provided by alignment of overlapping pixels, further providing a perception of a single focused pixel 940. However, when the single scan line is differentially distorted as illustrated in FIG. 9, pixels in the row of pixels can be out of alignment providing at least a partially blurred image. Thus, the vertically blurred line 930 can have focused portions, blurred portions, or any combination thereof. In certain embodiments, a vertical blur can be indicated by a spacing between a position of an edge pixel at a first time and a position of an edge pixel at a subsequent time (e.g., the vertical blur shown in FIG. 9 as a space between an edge pixel at time $t_1$ (942) and an edge pixel at time $t_7$ (944)). In some non-limiting examples, differential distortion can occur in any orientation. For example, a horizontal blur can occur within pixels in a single row of pixels. Additionally, differential distortion is not limited to rectangular arrays of pixels and can affect scanning display systems having any orientation.

II. Scanning Display System With Distortion Correction Element

The following discussion is directed towards a scanning display system having an optics assembly configured to mitigate optical and differential distortion thereby reducing blur from the scanning display system (e.g., from the optics 712).

Figure 10:
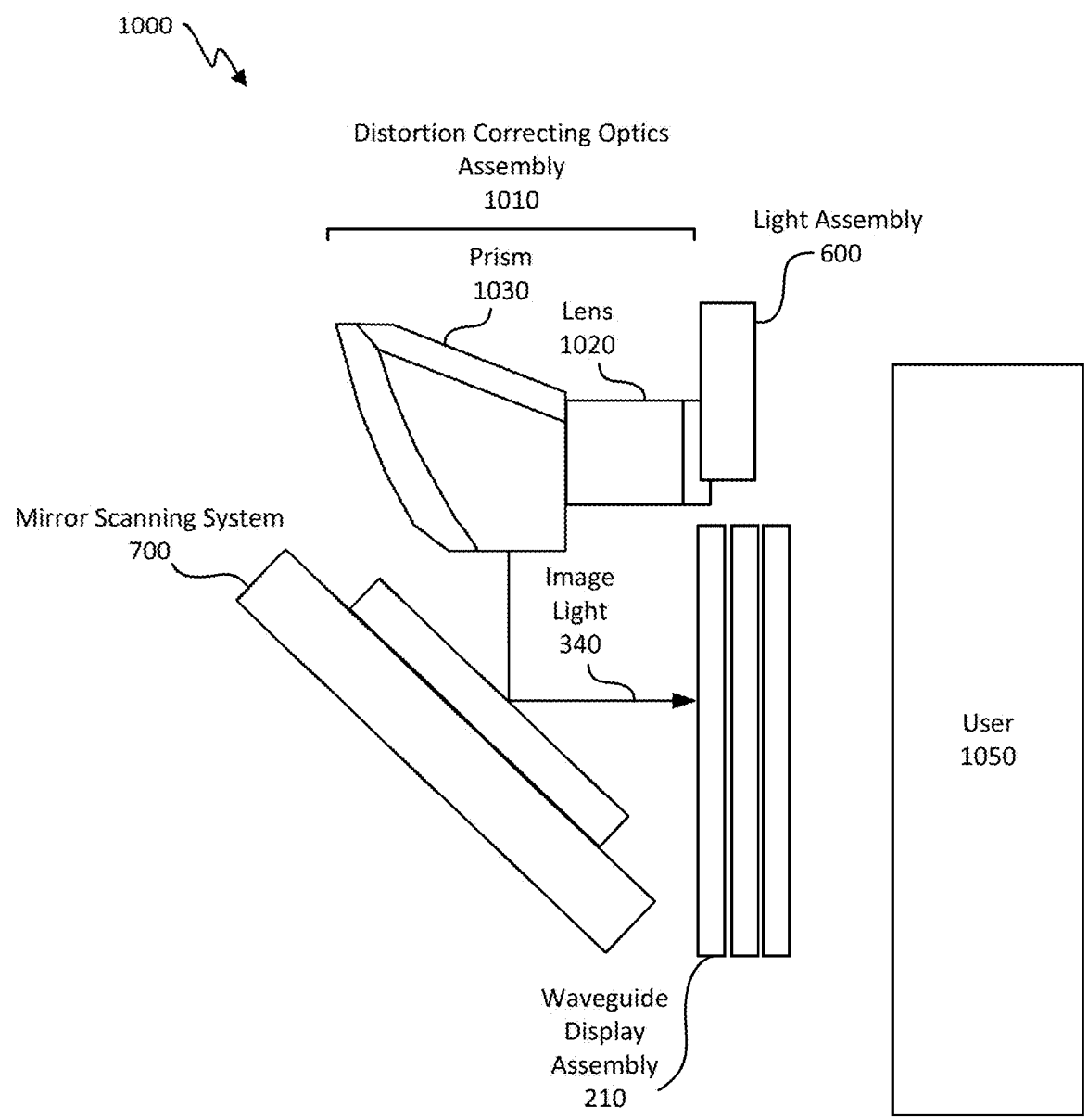
FIG. 10 is side view of an example light projection system that includes a distortion correcting optics assembly, according to certain embodiments.

FIG. 10 illustrates a scanning display system 1000 having a distortion correcting optics assembly 1010, according to one example. The distortion correcting optics assembly 1010 replaces the optics 712 described above.

As illustrated in FIG. 10, the distortion correcting optics assembly 1010 is positioned such that it can condition light propagating from the light assembly 600 to the mirror scanning system 700. In certain embodiments, the distortion correcting optics assembly 1010 comprises a lens 1020 and an optics assembly (e.g., a prism 1030). In some non-limiting examples, the distortion correcting optics assembly 1010 collimates and further mitigates optical and/or differential distortion from the image light provided by the light assembly 600. Thus, the distortion correcting optics assembly 1010 provides pre-distorted light to the mirror scanning system 700. Accordingly, the pre-distorted light is distorted to compensate for inherent distortion in the light projection system (i.e., the pre-distorted light is distorted equally and opposite to the inherent distortion). Ultimately, employing the distortion correcting optics assembly 1010 provides a non-distorted image to a user 1050.

In certain embodiments, light propagating from the light assembly 600 is conditioned by the lens 1020. Conditioning by the lens 1020 can include collimating, expanding, adjusting the orientation, otherwise altering the propagation of the light, or any combination thereof. In some cases, conditioning by the lens 1020 is a pre-conditioning (i.e., a first conditioning) performed before a subsequent conditioning (i.e., at least a second conditioning). In some non-limiting examples, the first conditioning is performed by a prism, a grating, a filter, or any combination thereof. In the present example, the first conditioning is performed by a lens (e.g., a field lens, a collimating lens, a cylindrical lens, a telecentric lens, a spherical lens, any suitable lens, or any combination thereof). In some non-limiting examples, the lens 1020 can be an anamorphic field lens which is a field lens configured to adjust light such that the amount of light adjusted is non-axisymmetric. As such, the lens 1020 is positioned and configured to capture light emitted by the light assembly 600 and transmit the light emitted from the light assembly 600 to the prism 1030, in an initially conditioned state.

In certain further embodiments, light propagating through the lens 1020 is further conditioned by the prism 1030. Conditioning by the prism 1030 can include collimating, expanding, adjusting the orientation, otherwise altering the propagation of the light, or any combination thereof. In some cases, conditioning by the prism 1030 is a subsequent conditioning (e.g., a final conditioning). In some aspects, the subsequent conditioning is performed by a lens, a grating, a filter, or any combination thereof. In certain embodiments, the prism 1030 can have at least one anamorphic aspheric surface. In some cases, an anamorphic surface is a surface that has bi-lateral symmetry (e.g., the surface is symmetrical about the y-axis and x-axis, but is not radially symmetric). In certain aspects, the surface may have symmetry about a single axis (e.g., the y-axis, but not about the x-axis). An anamorphic aspheric surface is a surface that can collimate the light (e.g., the aspheric aspect of the anamorphic aspheric surface), and compress the light in a first direction while not affecting the light in a second direction (e.g., a horizontal aspect of the light can be compressed while a vertical aspect is not compressed), which is the anamorphic aspect of the anamorphic aspheric surface. Thus, the anamorphic aspheric surface can provide collimated and compressed image light 340 (see FIG. 3).

In one example, the prism 1030 is a monolithic prism having a plurality of surfaces. In another example, the prism 1030 is an assembly of a plurality of freeform surfaces, and in conjunction, configured to receive, reflect, and transmit the light emitted by the light assembly 600. In the present example, the prism 1030 is configured to further condition the light conditioned by the lens 1020 before transmitting it to the mirror scanning system 700. As described in detail above, the mirror scanning system 700 reflects and scans the light transmitted from the distortion correcting optics assembly 1010 to a virtual image plane (e.g., the waveguide display assembly 210). The waveguide display assembly then transmits the light to the user 1050 via the display 110 (see FIG. 1).

Figure 11:
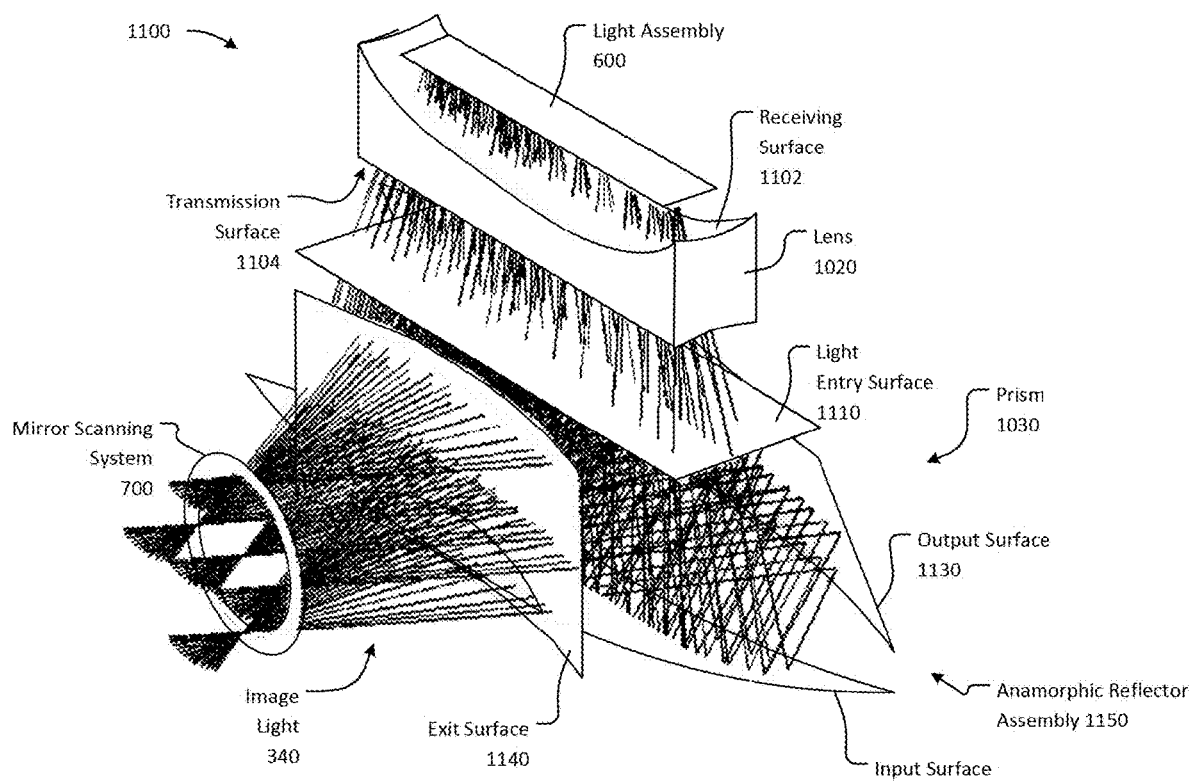
FIG. 11 is a perspective view of a light projection system that includes a distortion correcting optics assembly, according to certain embodiments.

FIG. 11 is a ray tracing diagram 1100 of the distortion correcting optics assembly 1010 (see FIG. 10), according to one example. In this example, provided is an exploded view of the distortion correcting optics assembly 1010. The distortion correcting optics assembly 1010 includes the lens 1020 and the prism 1030. The lens 1020 can have a plurality of light transmission surfaces, including a receiving surface 1102 that receives image light 340 from the light assembly 600 and a transmission surface 1104 that transmits optically corrected light (i.e., conditioned light) propagating from the light assembly 600 to the prism 1030. The receiving surface 1102 of the lens 1020 can be a Zernike surface and the transmission surface 1104 can be an anamorphic aspheric surface. The prism 1030 can have a plurality of light transmission surfaces and a plurality of light reflection surfaces, including a light entry surface 1110 (transmission), an input surface 1120 (reflection), an output surface 1130 (reflection), and an exit surface 1140 (transmission). In certain embodiments, the input surface 1120 and the output surface 1130 form an anamorphic reflector assembly 1150. In one example, the prism 1030 is a monolithic prism having a plurality of surfaces. In another example, the prism 1030 is an assembly of a plurality of freeform surfaces, and in conjunction, configured to receive, reflect, and transmit the light transmitted by the lens 1020.

In one example, the prism 1030 is a plurality of freeform surfaces including the light entry surface 1110, the input surface 1120, the output surface 1130, and the exit surface 1140. In conjunction, the surfaces are configured to receive, reflect, and transmit light transmitted from the lens 1020. The light then propagates through the prism 1030 by entering through the entry surface 1110, reflecting from the input surface 1120 to the output surface 1130, reflecting from the output surface 1130 to the exit surface 1140, and exiting the prism 1030 as further conditioned light.

Thus, in conjunction with the lens 1020, the prism 1030 is configured to at least optically correct aberrations, distortions, and field of curvature of the light emitted by the light assembly 600 via an anamorphic reflector assembly 1150 created by the input surface 1120 and the output surface 1130 reflecting the light transmitted by the lens 1020 in conjunction. As described herein, the lens 1020 is an axi-symmetric non-rotationally symmetric lens. The prism 1030 includes non-axisymmetric aspheric reflective surfaces (e.g., the input surface 1120 and the output surface 1130) that condition the light emitted from the light assembly 600 to pre-distort the light emitted from the light assembly 600 to correct the optical and differential distortion found in a system without the distortion correcting optics assembly 1010.

The prism 1030 includes a light entry surface 1110 configured to receive the light transmitted from the lens 1020 and transmit the light internally through the anamorphic reflector assembly 1150. The input surface 1120 reflects and directs the reflected light to the output surface 1130. The output surface 1130 reflects and directs the reflected light to the exit surface 1140. The anamorphic reflector assembly 1150 (e.g., the input surface 1120 and the output surface 1130 working in conjunction) is configured to perform total internal reflection of the light transmitted through the light entry surface 1110. The prism 1030 finally includes the exit surface 1140 configured to receive and transmit the reflected light from the output surface 1130 to the mirror scanning system 700. In one example, the input surface 1120 and the output surface 1130 of FIG. 11 can each be a Zernike surface, or Zernike polynomial surface (e.g., non-axisymmetric aspheric surfaces having an offset bilateral symmetry).

In one example, the distortion correcting optics assembly 1010 is configured to reduce optical and/or differential distortion such that light projected from the light assembly 600 is reflected and scanned from the mirror scanning system 700 and mapped onto the virtual image plane (e.g., the waveguide display assembly 210, see FIG. 10) as projected from the light assembly 600. In the present example, the optical distortion found in a system without the distortion correcting optics assembly 1010, and the differential distortion caused by scanning the image light 340 that is not pre-distorted (see FIGS. 8A-8C and 9) will be reduced, thereby reducing the amount of blur in the display 110.

In one example, the distortion correcting optics assembly 1010 is configured to correct the vertical blur (see FIG. 9) caused by differential distortion occurring during image scanning as described above. Thus, referring to FIG. 9, the vertical blur (i.e., distance between the edge pixel at time $t_1$ (942) and the edge pixel at time $t_7$ (944)) is significantly reduced by pre-distorting the light emitted from the light assembly 600. In a further example, the distortion correcting optics assembly 1010 is configured to correct the vertical blur and a horizontal blur (e.g., distortion along the scan direction and distortion across the scan direction). The horizontal blur is caused by differential distortion occurring during image scanning similar to the vertical blur. Thus, the distortion correcting optics assembly 1010 can be configured to correct vertical and horizontal blur.

Figure 12:
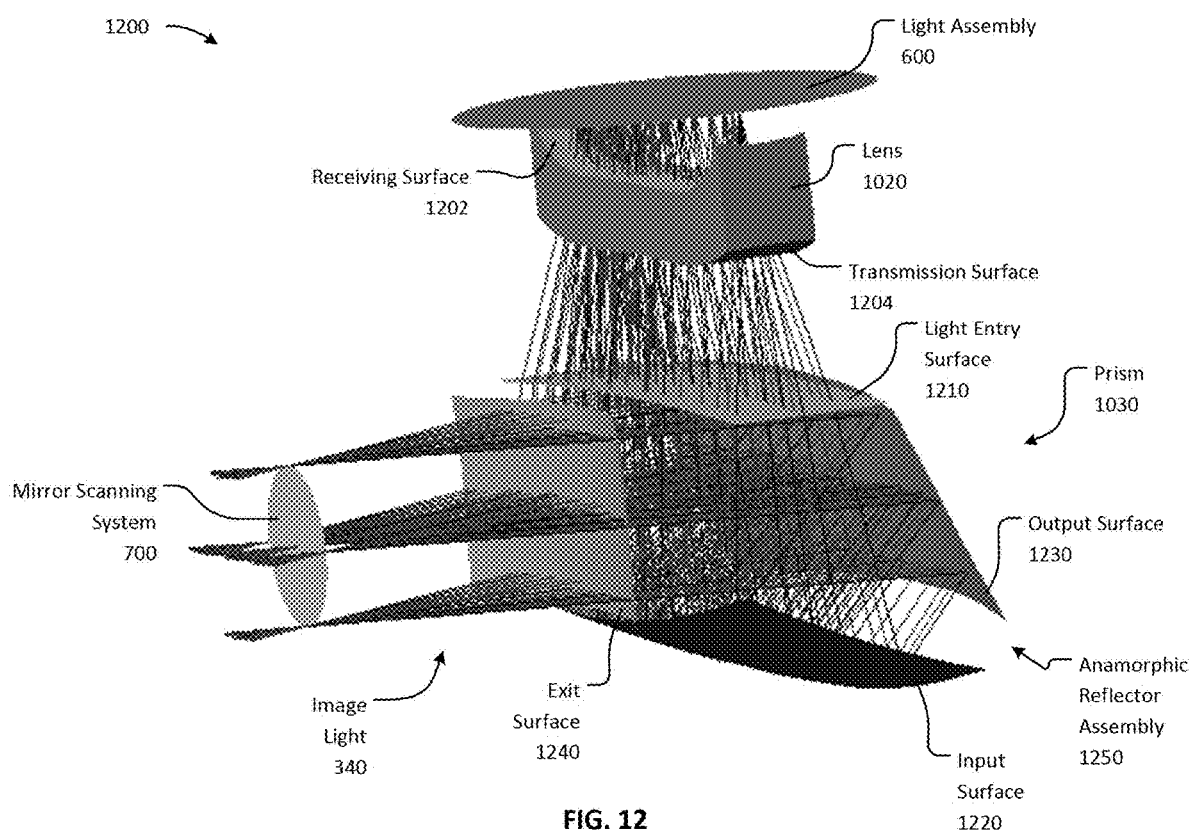
FIG. 12 is a perspective view of a light projection system that includes a distortion correcting optics assembly according to certain embodiments.

FIG. 12 is a ray tracing diagram 1200 of the distortion correcting optics assembly 1010 (see FIG. 10), according to a further example. In the example of FIG. 12, light propagation is similar to the light propagation in the example of FIG. 11. In the example of FIG. 12, the prism 1030 can have a light entry surface 1210, and input surface 1220, and output surface 1230, and an exit surface 1240 providing an anamorphic reflector assembly 1250. The anamorphic reflector assembly 1250 can have a modified shape compared to the anamorphic reflector assembly 1150 in the example of FIG. 11. Thus, components of the distortion optics assembly 1010 can be tailored for specific light conditioning requirements. For example, the distortion correcting optics assembly 1010 can be tailored to condition light for a specific mirror scanning system 700, a specific waveguide display assembly 210, a specific light assembly 600, any suitable optical assembly and/or system, or any combination thereof.

Figure 13:
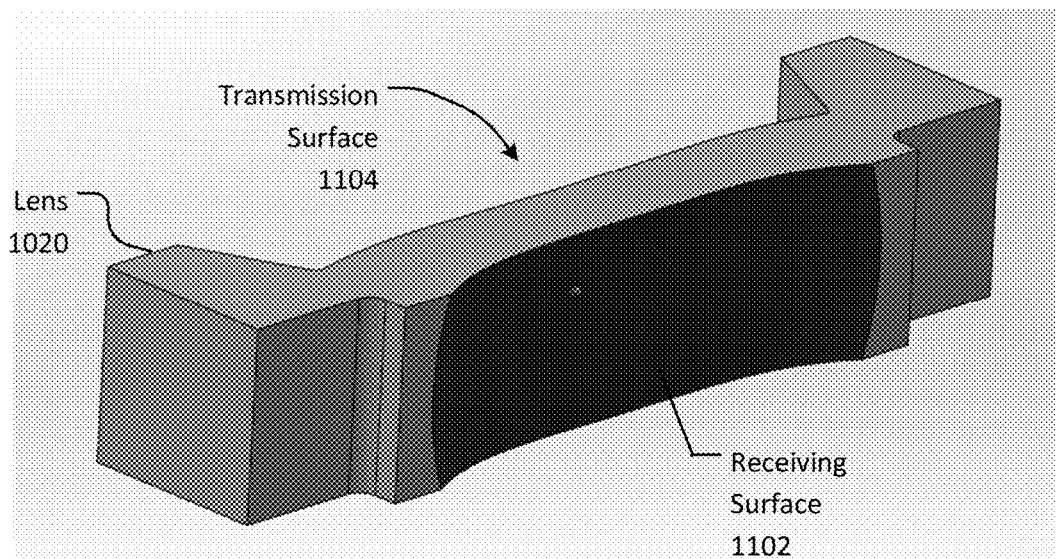
FIG. 13 is a perspective view of a field lens, according to certain embodiments.

FIG. 13 illustrates a perspective view of the lens 1020 (see FIG. 10). As illustrated in FIG. 13, the lens 1020 is a field lens having the receiving surface 1102 and the transmission surface 1104. The field lens is configured to pre-distort the light emitted from the light assembly 600. In one example, the field lens at least partially mitigates distortion found in a system without the distortion correcting optics assembly 600 by pre-distorting the light emitted from the light assembly 600. As described above, the receiving surface 1102 can be a Zernike surface and the transmission surface 1104 can be an anamorphic aspheric surface. At least in part due to the field lens, light projected from a scanning display system employing the distortion correcting optics assembly 1010 onto an image plane (e.g., the waveguide display system 210) will be optically corrected. Thus, blur caused by scanning a distorted image will be reduced and/or eliminated.

In one example, the field lens is configured to optically correct field curvature. The field lens can be placed as close as possible to the light assembly 600 (see FIG. 10). The field lens can also be configured to control the angle of incidence of light projected onto the prism 1030 and effectively collimate light emitted from the light assembly 600. In one example, the field lens can also be configured to correct aberration. The field lens can correct spherical and chromatic aberration.

Figure 14A:
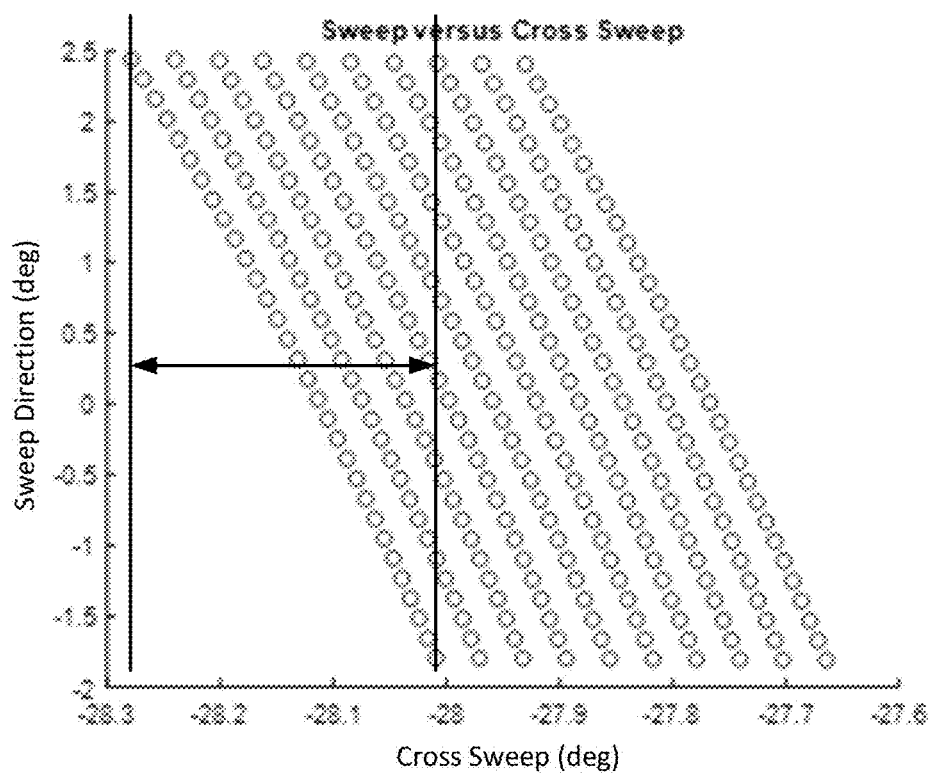
FIG. 14A shows a sweep error along an axis perpendicular to a scan direction from a comparative light projection system.
Figure 14B:
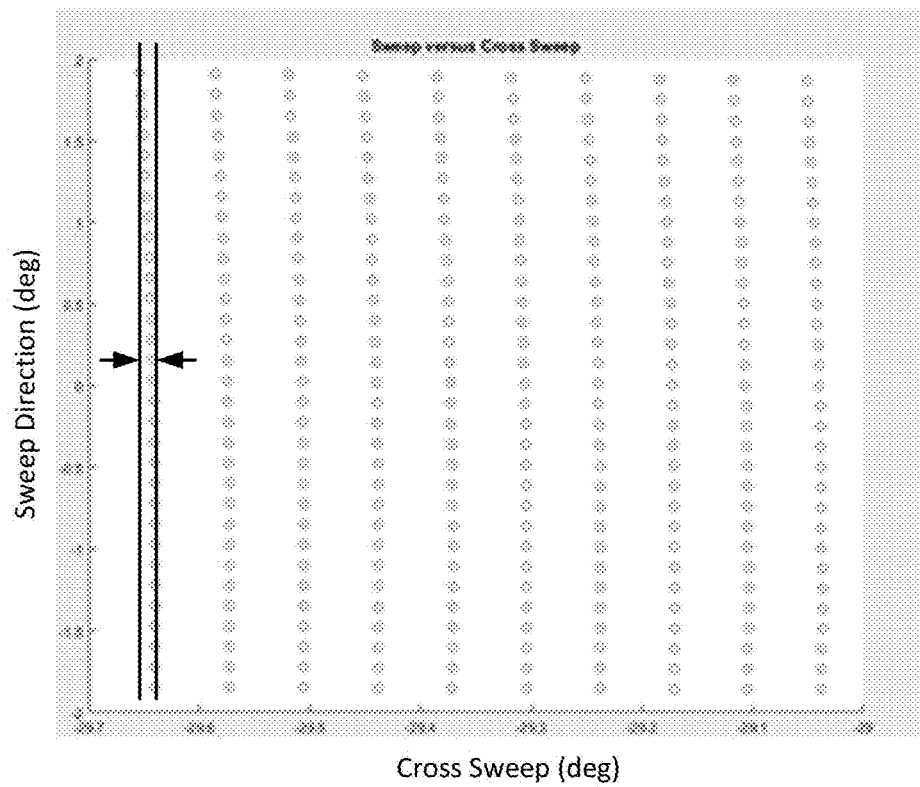
FIG. 14B shows a sweep error along an axis perpendicular to a scan direction from a light projection system including a distortion correcting optics assembly.

FIGS. 14A-14B show a comparison of a delta sweep error along an axis perpendicular to the scan direction between a comparative scanning display system (as in the example of FIGS. 4-7) without a distortion correcting optics assembly 1010 and a scanning display system employing the distortion correcting optics assembly 1010 (as in the example of FIG. 10). As illustrated herein, the delta sweep error shows an angular shift of a pixel on an image plane (referred to as "Cross Sweep (deg)" in FIG. 14A) as image light 340 is scanned by the mirror scanning system 700. In the example of FIG. 14A, the Cross Sweep was recorded as the scan mirror scanned the image light from a position of 2.5° from a resting position (e.g., 0°) to a position −2° from the resting position (i.e., a 4.5° sweep, referred to as "Sweep Direction (deg)" in FIG. 14A). FIG. 14A shows a delta sweep error of about 0.3° (indicated by vertical lines and dimension arrows), indicating that the pixel being recorded does not maintain alignment over the course of 31 scans in the 4.5° scan period, thus providing a blurred image at that pixel location. FIG. 14B shows the delta sweep error of a corrected system (e.g., a scanning display system employing the distortion correcting optics assembly 1010 as described herein in the examples above). The corrected system exhibited a reduced delta sweep error of about 0.02° over a 4° source width, indicating the pixel maintained alignment as the top pixel (at about 2°) was scanned down and over the bottom pixel (at about −2°), providing an order of magnitude reduction in delta cross sweep error.

Figure 15A:
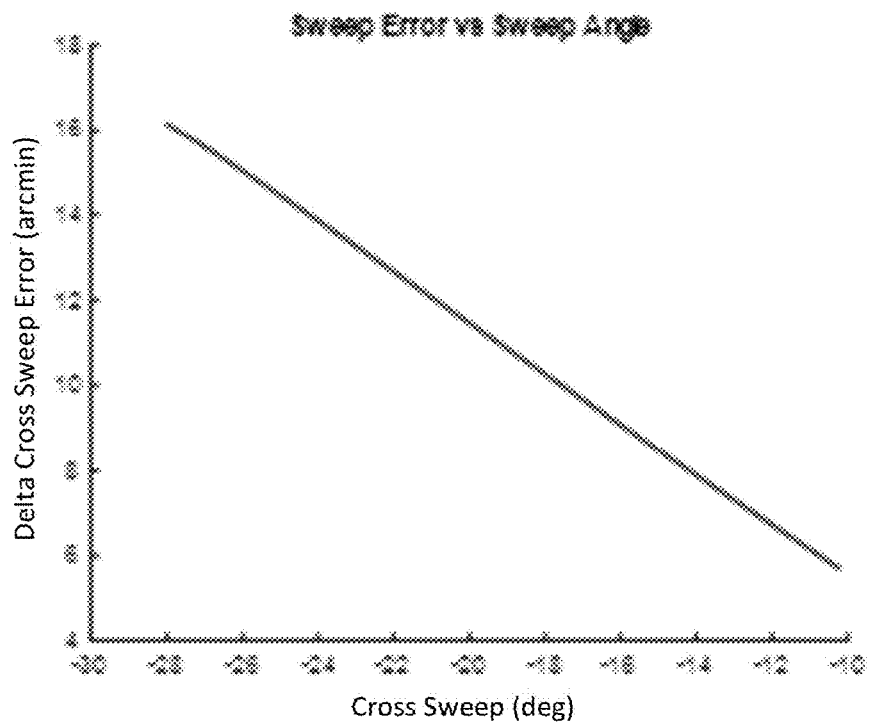
FIG. 15A shows a sweep error versus sweep angle from the comparative light projection system of FIG. 14A.
Figure 15B:
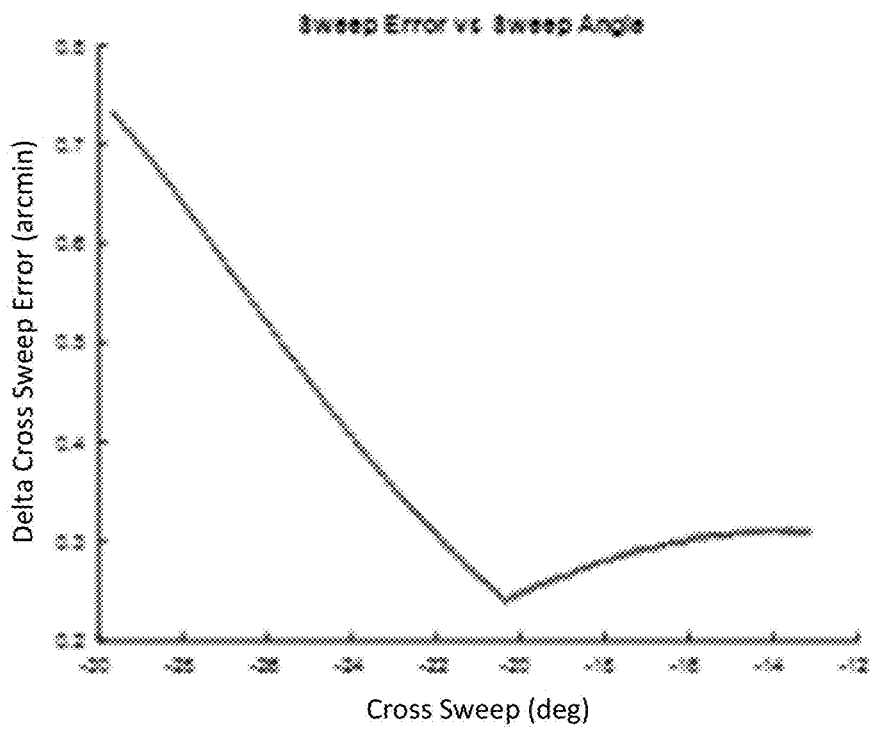
FIG. 15B shows a sweep error versus sweep angle from the comparative light projection system of FIG. 14B.

FIGS. 15A-15B show a comparison of the delta sweep error to the cross sweep for the comparative scanning display system and the corrected scanning display system employing the distortion correcting optics assembly 1010 as in the example of FIGS. 14A-14B. FIG. 15A further illustrates the delta cross sweep error of the comparative scanning display system, indicating that the delta cross sweep error propagates linearly with the cross sweep, wherein a higher cross sweep provides a higher error. FIG. 15B illustrates the delta cross sweep error of the corrected scanning display system employing the distortion correcting optics assembly 1010 described herein wherein the delta cross sweep error is reduced an order of magnitude compared to the comparative scanning display system of FIG. 15A.

Figure 16:
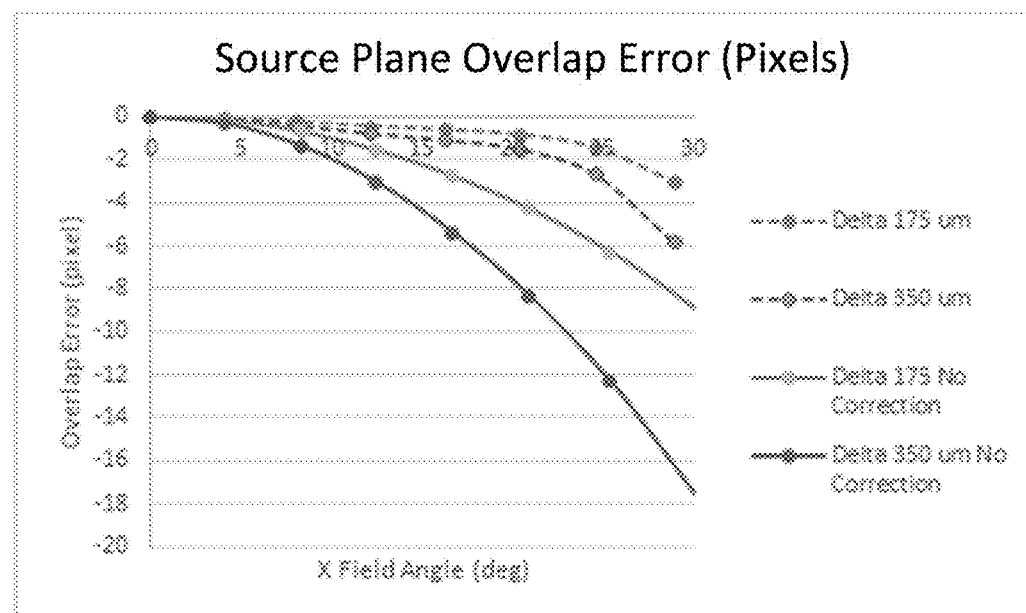
FIG. 16 shows a pixel overlap error of a scanned image from a light projection system.

FIG. 16 shows the amount of overlap error as the top row is scanned downed to the bottom row (see FIG. 8A-C). Overlap error was evaluated for different source widths (e.g., 175 µm and 350 µm). In the example of FIG. 16, the overlap error is a result of pixel displacement across the row when scanning at various distances. FIG. 16 shows the overlap error for the comparative scanning display system and the corrected scanning display system employing the distortion correcting optics assembly 1010 as in the example of FIGS. 14A-15B. FIG. 16 shows the pixel overlap error in terms of pixel dislocation caused by the differential distortion in the comparative scanning display system (indicated by solid lines) and pixel dislocation caused by residual differential distortion in the corrected scanning display system employing the distortion correcting optics assembly 1010 (indicated by dashed lines). Pixel dislocation was measured by recording the pixel location on the source plane and subtracting the pixel location recorded on the source plane. Overlap error was reported as a number of pixels over which the pixel was dislocated. As shown in the graph of FIG. 16, an overlap error of 12 pixels was reduced to an overlap error of about 2.5 pixels employing the distortion correcting optics assembly 1010 in the corrected scanning display system. Additionally, an overlap error of about 6.25 pixels was reduced to an overlap error of about 1.5 pixels employing the distortion correcting optics assembly 1010 in the corrected scanning display system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A display system comprising:
a light assembly configured to generate source light for a display image;
a distortion correcting optics assembly comprising:
an anamorphic field lens configured to receive the source light from the light assembly and apply a first distortion to the source light, and
an optical device including at least one anamorphic aspheric surface configured to receive the source light from the anamorphic field lens and apply a second distortion to the source light from the anamorphic field lens, the second distortion comprising collimation; and
a scanning system configured to receive and redirect the source light having the first distortion and the second distortion from the distortion correcting optics assembly,
wherein the first distortion and the second distortion at least partially compensate for optical distortion caused by the scanning system.

2. The display system of claim 1, wherein the light assembly comprises one or more light sources.

3. The display system of claim 2, wherein the one or more light sources provide one or more display pixels.

4. The display system of claim 3, where the one or more display pixels comprise an image light.

5. The display system of claim 1, wherein the source light having the first distortion and the second distortion comprises pre-distorted and collimated source light.

6. The display system of claim 1, wherein the anamorphic field lens is configured to perform at least one of collimating the source light, expanding the source light, or adjusting an orientation of the source light.

7. The display system of claim 1, wherein the anamorphic field lens is configured to apply axisymmetric adjustment to the source light.

8. The display system of claim 1, wherein the distortion correcting optics assembly comprises a monolithic prism.

9. The display system of claim 1, wherein the distortion correcting optics assembly comprises a freeform prism including one or more light transmission surfaces, and one or more light reflection surfaces.

10. The display system of claim 9, wherein the freeform prism is configured to distort and collimate the source light.

11. The display system of claim 9, wherein the one or more light transmission surfaces comprise a freeform surface.

12. The display system of claim 9, wherein the one or more light transmission surfaces comprise at least one of a Zernike surface, an anamorphic aspheric surface, a flat surface, a non-rotationally symmetric surface, or a non-axisymmetric surface.

13. The display system of claim 9, wherein the one or more light reflection surfaces comprise at least one of a Zernike surface, an anamorphic aspheric surface, a flat surface, a non-rotationally symmetric surface, or a non-axisymmetric surface.

14. The display system of claim 1, wherein the scanning system comprises a mirror scanning system.

15. The display system of claim 14, wherein the mirror scanning system is configured to undistort the source light outputted from the distortion correcting optics assembly.

16. The display system of claim 1, wherein the distortion correcting optics assembly and the scanning system are configured to transmit undistorted image light to an image plane.

17. The display system of claim 16, wherein the image plane comprises at least one of a virtual image plane, a coupler, a waveguide, a display, a near-eye display, or a user.

18. The display system of claim 16, wherein the undistorted image light comprises image light devoid of at least one of a barrel distortion, a pincushion distortion, a mustache distortion, a keystone distortion, or a differential distortion.

19. The display system of claim 18, wherein the at least one of the barrel distortion, the pincushion distortion, the mustache distortion, the keystone distortion, or the differential distortion comprises pixel misalignment on the image plane.

20. The display system of claim 19, wherein the distortion correcting optics assembly provides pixel alignment on the image plane.

* * * * *